Oct. 23, 1934.                H. R. TEAR                1,977,867
                            LUBRICATION DEVICE
                            Filed Feb. 1, 1932
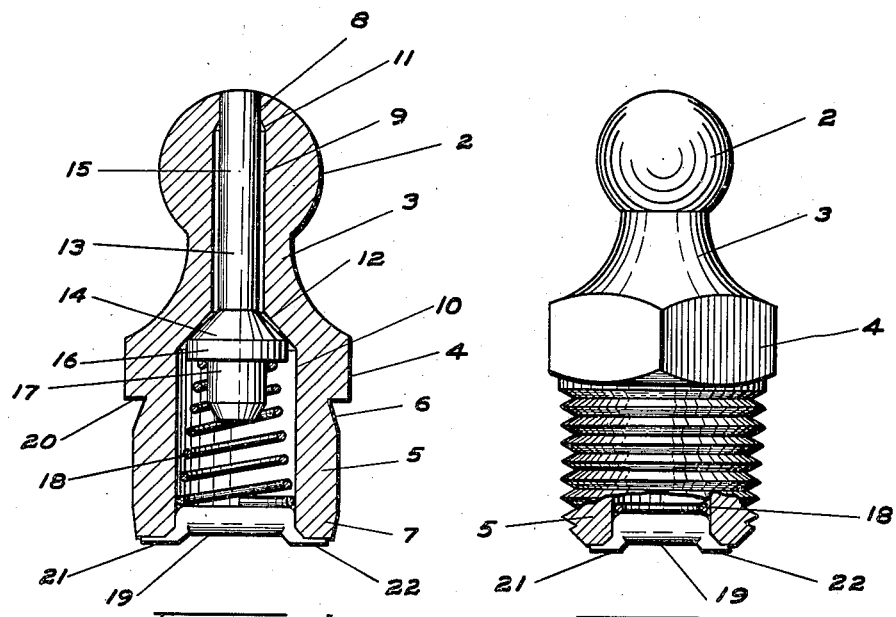
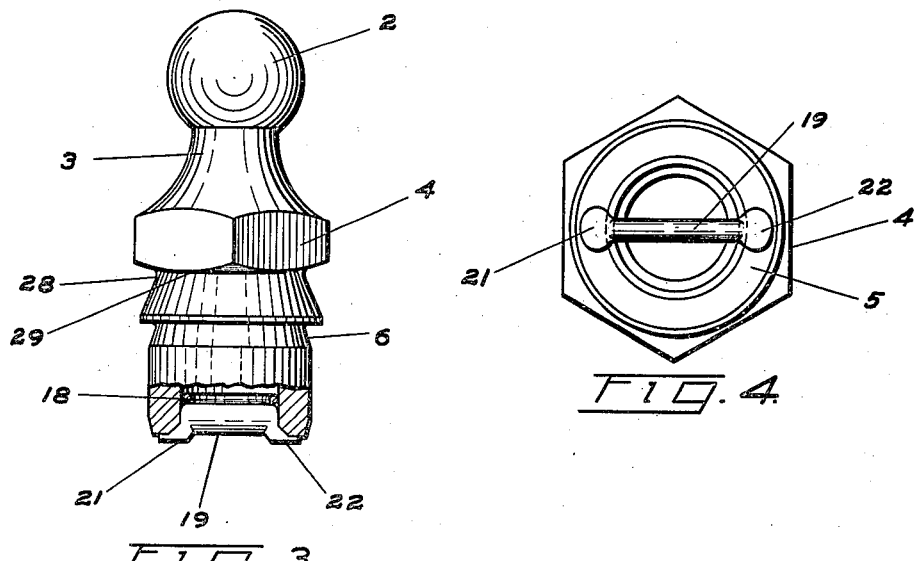
INVENTOR.
HARRY R. TEAR
BY
ATTORNEY.

Patented Oct. 23, 1934

1,977,867

UNITED STATES PATENT OFFICE 1,977,867

LUBRICATION DEVICE

Harry R. Tear, South Bend, Ind., assignor to The Lubrication Corporation, South Bend, Ind., a corporation of Delaware Application February 1, 1932, Serial No. 590,106

9 Claims. (Cl. 29—84)

This invention relates to lubricating devices and more particularly to lubricating fittings or nipples through which lubricant is conducted to bearings.

Fittings of this type as shown in the application of John L. Creveling, Serial #563,409 and Adiel Y. Dodge, Serial #563,419 are usually constructed with valves that are urged toward their seats by means of compression springs. Various means have been employed for permanently holding the spring and valve assembly in its desired position within the fitting and it is to this feature of the fitting that the present invention principally relates.

It is desirable in a lubricating fitting or nipple, that the valve and spring assembly be permanently held in place by means integral with the fitting body so as to assure against disassociation of the parts in use. With some types of fittings it is also desirable that the fitting body be hardened for utilitarian purposes as for instance, in a steel body drive type fitting where the shank must be hardened to a high degree and in fittings wherein a metal to metal contact between fitting head and feeder nozzle is utilized to form a lubricant tight seal.

One method, employed prior to this invention, of retaining the valve and spring assembly permanently within the fitting necessitated the malleability of at least that portion of the fitting which was deformed to retain the spring as shown in the aforesaid applications.

An object of this invention is to provide in a lubricating fitting improved means for permanently retaining the valve and spring assembly in place therein.

Another object is to provide a lubrication fitting as described wherein if desired, the entire fitting body may be hardened for functional purposes and in which the spring retention means is made an integral part of the fitting subsequent to the hardening thereof without further treatment of the body.

Another object is to provide a lubrication fitting wherein malformation of the adjacent body portion may not occur as a result of the formation of the valve and spring retaining means. This feature is of importance, especially where fairly close tolerances are maintained between the fitting and the bore or recess in which it is fixed as in the case of fittings having screw threaded shanks.

Another object is to provide a fitting as described which is economical to manufacture.

A further object is to provide an improved method of assembly and construction of a lubrication fitting.

Other objects and advantages of the invention will be apparent after reading the following specification and referring to the accompanying drawing forming a part thereof, wherein:

Fig. 1 is a sectional view of a lubricating fitting incorporating one form of valve and spring retaining means of the character embraced by this invention, Figs. 2 and 3 are part sectional elevations illustrating the valve and spring retaining means applied to other types of lubricating fittings, and Fig. 4 is a bottom plan view of the fitting illustrated in Fig. 1.

With reference to the drawing I have illustrated in Figs. 1, 2 and 3, three types of lubrication fittings differing from one another principally in the manners in which they are intended to be secured to the bearing or receiving member. The internal parts including the valve, the spring and the retaining means therefor are identical in each form. This internal construction is best shown in Fig. 1 wherein I have illustrated a drive fitting formed with a ball head 2, a neck portion 3, a wrench engaging intermediate body 4 and a shank 5.

The fitting is further formed with a plurality of aligned bores 8, 9 and 10, with bevelled bodies 11 and 12 intermediate the bores 8 and 9 and 9 and 10 respectively. A valve member 13 is disposed within the aligned bores and is formed with a tapered contact body 14 adapted to fit upon the bevelled shoulder or valve seat 12 formed at the juncture of bores 9 and 10. The valve is further constructed with an outwardly extending stem 15 adapted to enter and substantially close the bore 8. The tapered body 14 merges with an enlarged portion 16 of the valve member 13 from which a depending projection 17 extends.

A valve spring 18 is disposed beneath the valve 13 with its upper end encompassing the projection 17 and bears against the under surface of the enlarged portion 16 to urge the valve upwardly against its seat 12.

Means providing a seat or retainer for the lower end of the spring 18 and hence a retainer for both the valve and the spring within the aligned bores 8, 9 and 10 respectively comprises a diametrically disposed elongated retainer member 19 extending across the lower mouth of the bore 10 and welded at its opposite ends 21 and 22 to the end wall of the shank 5, as best shown in Fig. 4. In practice the retainer 19 is preferably formed from wire selected for its strength and its ability to properly unite, through welding, with the metal of the shank. The wire, which may be round, square or of other shape in cross-section is fed across the bottom of the fitting subsequent to the assembly of the valve and spring in the bores 8, 9 and 10, whereupon those parts of the wire contacting with the bottom surface of the shank are merged therewith by spot welding to form the retainer 19 as it appears in the drawing.

It is evident that by this method of retaining the valve and spring assembly permanently in place within the fitting body that if desirable the entire body, including the head 2, the neck 3 and the shank 5 may be hardened to any degree of hardness desired prior to the assembly of the valve and spring and the securing of the retainer 19 in place without necessitating any further treatment such as the annealing of a portion of the shank for the purpose of forming the spring retainer as would be necessary in such structures as disclosed in the aforesaid pending applications.

As a matter of fact if this procedure were necessary in the type of fitting illustrated in Fig. 1, the fitting would be inefficient for the purpose intended, as in the drive type fitting illustrated it is imperative that the shank 5 be hardened to a relatively high degree so as to cause displacement of metal at the mouth of the bore or recess into which the shank 5 is driven into an annular depression 6 formed on the outer wall of the shank by swaging action of the drive shoulder 20 defining one wall of the depression 6. It is also essential in all of the fittings illustrated herein that the ball head 2 be hardened as in this type of fitting a metal to metal contact between the head and the nozzle of the lubricant feeder is utilized to form a lubricant-tight seal.

Aside from possessing the functional advantages herein described, this method and structure for valve and spring retention possesses additional merit in its ease of assembly and economy in manufacture, inasmuch as the assembly of the parts and the actual fixing of the retainer permanently in place as a substantially integral part of the fitting body may be performed under control of one operator in charge of the welding process, or by automatic machine.

In Fig. 2, I have illustrated a fitting which in internal construction is identical to the fitting illustrated in Fig. 1, but wherein the shank 5 is externally threaded for engagement with an internally threaded bore or recess in the bearing or receiving member. In connection with this type of fitting, a further advantage of the valve and spring retaining means embraced by this invention is noted. This advantage is attained by virtue of the non-malformation of the shank 5 resulting from the fixing of the elongated retaining member 19 in place upon the shank and is appreciated because in the screw type of fitting, fairly close tolerances must be maintained between the diameters of the threaded shank and threaded receiving bore. Attention is called again to that type of fitting wherein a part of the internal wall of the shank is displaced by swaging or upsetting to form a spring retainer seat necessitating, in the forming process, relatively high stresses upon the walls of the shank as the plunger of the forming press swages or upsets the metal. The result of this process has often caused sufficient malformation to render the fitting inoperative for the purpose intended.

In Fig. 3, I have illustrated another type of fitting which is identical to that type of fitting shown in Fig. 1 with the exception that an annular groove 28 is formed on the shoulder immediately above the shank 5, one wall of which, is defined by shoulder 29 lying in a plane perpendicular to the axis of the fitting and is utilized for engagement with an extraction tool for the purpose of withdrawing the fitting as for replacement. In all other respects, the advantages of the valve and spring retainer means incorporated therein as previously described applies.

It is to be understood that the above described embodiments of my invention are for the purpose of illustration only and various changes may be made therein without departing from the spirit and scope of the invention.

I claim:

1. In a lubrication fitting having a heat treated hard metal body including a shank, said shank having a bore extending longitudinally therethrough, a valve positioned in said bore, a spring disposed in the bore behind the valve, and a spring retainer extending across the mouth of said bore at the end thereof and welded to the adjacent portions of said shank.

2. A lubrication fitting having a hard metal shank adapted to be secured in a receiving member, said fitting having a bore extending through said shank and a valve seat, a valve disposed in said bore for engagement with said seat, a spring in said bore normally retaining said valve against said seat, and a spring retainer extending across the end of said shank over the mouth of said bore and welded to said shank.

3. A lubrication fitting comprising, a shank portion having a bore extending longitudinally therethrough, a valve member in said bore, a spring behind said valve, and a piece of wire of less diameter than the diameter of said bore extending across the mouth of said bore behind and in the path of said spring, said wire being welded at its ends to the end of said shank adjacent the mouth of said bore.

4. The method of constructing a lubrication fitting which comprises forming a metal body with a lubricant port and a bore communicating therewith, in assembling a valve within the bore, in assembling a spring beneath the valve, and in subsequently welding a spring retainer to the body across said bore and beneath the spring to form a seat for the spring.

5. The method of constructing a lubrication fitting which comprises forming a metal body with a lubricant port and a communicating bore, in assembling a valve within the bore, in assembling a spring in the bore beneath the spring, in placing a metal wire diametrically across the mouth of the bore beneath the spring and in welding the opposite ends of the wire to said metal body.

6. The method of constructing a lubrication fitting which comprises forming a metal body with a lubricant port and a bore communicating therewith, in hardening said body, in assembling a valve within the bore, in assembling a spring beneath the valve and in subsequently welding a spring retainer to the body beneath the spring to form a seat therefor.

7. A lubrication fitting comprising a body having a lubricant passage therethrough, a valve in said body for closing said passage, a spring behind the valve, and a wire welded across one end of said body in the path of exit of said spring.

8. A lubrication fitting comprising, a hardened metal shank having a bore extending longitudinally therethrough, a valve member in said bore, a spring behind said valve, and a piece of wire of less diameter than the diameter of said bore extending across the mouth of said bore behind and in the path of said spring, said wire being welded at its ends to the end of said shank adjacent the mouth of said bore.

9. A lubrication fitting comprising, a shank portion for reception in a recess in a receiving member, said shank having a bore extending therethrough, a valve in said bore, a spring behind and engaged with said valve, and a spring retainer extending across the mouth of said bore behind said spring and secured substantially integrally with and to said shank adjacent to and at substantially opposite sides of said bore, said retainer lying in substantially the plane of the mouth of said bore.

HARRY R. TEAR.